United States Patent
Fan et al.

(10) Patent No.: US 12,039,342 B2
(45) Date of Patent: Jul. 16, 2024

(54) ELECTRONIC SYSTEM AND RELATED METHOD FOR PROVIDING MULTIPLE HOSTS WITH NETWORK CONNECTIVITY AND REMOTE WAKE-UP

(71) Applicant: QISDA CORPORATION, Taoyuan (TW)

(72) Inventors: Yu-Fu Fan, Taoyuan (TW); Chang-Cheng Chen, Miaoli County (TW); Wan-Wei Chi, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 267 days.

(21) Appl. No.: 17/573,658

(22) Filed: Jan. 12, 2022

(65) Prior Publication Data
US 2023/0126257 A1    Apr. 27, 2023

(30) Foreign Application Priority Data
Oct. 27, 2021 (CN) .......................... 202111252816.X

(51) Int. Cl.
*G06F 9/4401*     (2018.01)
*G06F 1/3209*     (2019.01)
*G06F 13/40*      (2006.01)

(52) U.S. Cl.
CPC .......... *G06F 9/4416* (2013.01); *G06F 1/3209* (2013.01); *G06F 13/4022* (2013.01); *G06F 13/4027* (2013.01); *G06F 13/4068* (2013.01); *G06F 2213/0042* (2013.01); *G06F 2213/3808* (2013.01)

(58) Field of Classification Search
CPC .... G06F 1/3209; G06F 1/3278; G06F 9/4416; G06F 9/4418; G06F 13/4022; G06F 13/4027; G06F 13/4045; G06F 13/4068; G06F 15/1735; G06F 2213/0042; G06F 2213/3808

See application file for complete search history.

(56) References Cited

U.S. PATENT DOCUMENTS

| | | | |
|---|---|---|---|
| 2004/0203296 A1* | 10/2004 | Moreton | G06F 13/387 439/894 |
| 2008/0270599 A1* | 10/2008 | Tamir | H04L 41/0803 709/224 |
| 2009/0241113 A1* | 9/2009 | Seguin | G06F 1/3209 718/1 |
| 2009/0296723 A1* | 12/2009 | Chang | H04L 12/4625 370/401 |
| 2011/0138044 A1* | 6/2011 | Bailey | H04L 12/12 709/225 |
| 2018/0074830 A1* | 3/2018 | Lambert | G06F 13/4022 |
| 2020/0326955 A1* | 10/2020 | Adiletta | G06F 1/1684 |

* cited by examiner

*Primary Examiner* — Thomas J. Cleary

(57) ABSTRACT

An electronic system includes a display device, a first host and a second host. The display device includes a network interface port for connecting to an external network, a first port, a second port, a control unit for recording information associated with a designated network bridge target, and a hub unit for controlling the signal transmission between the network interface port, the first port, the second port and the control unit. The first host is coupled to the first port and configured to activate network bridge function when set as the designated network bridge target, thereby connecting to the external network. The second host is coupled to the second port and configured to connect to the external network using the network bridge function via the second port, the hub unit and the first port.

12 Claims, 4 Drawing Sheets

ELECTRONIC SYSTEM AND RELATED METHOD FOR PROVIDING MULTIPLE HOSTS WITH NETWORK CONNECTIVITY AND REMOTE WAKE-UP

BACKGROUND OF THE INVENTION

1. Field of the Invention

The present invention is related to an electronic system and related method for providing multiple hosts with network connectivity and remote wake-up, and more particularly, to an electronic system and related method for providing multiple hosts with network connectivity and remote wake-up via a KVM and network bridging structure.

2. Description of the Prior Art

A widescreen display device can display high definition images with a wider field of vision, thereby providing a user with better entertainment experiences and the ease to work with multiple windows. Current widescreen display devices usually support dual connectivity to two hosts and simultaneously display the screens of the two hosts in a twin view mode. For example, a widescreen display device can be simultaneously connected to two electronic devices, such as any two of cellular phones, desktop computers and notebook computers. More and more widescreen display devices also provide network connectivity function, which enables a host connected to a widescreen display device to access a network via the widescreen display device.

However, although a prior art widescreen display device can support dual connectivity and provide network connectivity function, it can only allow one host to access the network when connected to two hosts. After the two hosts connected to the prior art widescreen display device enter the power-saving mode, the prior art widescreen display device can only wake up one host. Therefore, there is a need of an electronic system and related method for providing multiple hosts with network connectivity and remote wake-up.

SUMMARY OF THE INVENTION

The present invention provides an electronic system which provides multiple hosts with network connectivity and remote wake-up. The electronic system includes a display device, a first host and a second host. The display device includes a network interface port for connecting to an external network, a first port, a second port, a control unit configured to record information associated with a designated network bridge target, and a hub unit configured to control signal transmission between the network interface port, the first port, the second port and the control unit. The first host includes a first embedded controller, coupled to the first port, and configured to activate a network bridge function when set as the designated network bridge target, thereby connecting to the external network via the network interface port. The second host includes a second embedded controller, coupled to the second port, and configured to connect to the external network using the network bridge function via the second port, the hub unit and the first port.

The present invention also provides a method of providing multiple hosts with network connectivity. The method includes a display device connecting to an external network and activating a network bridge option, a first host connecting to the external network after connecting the first host and a second host to the display device, setting the first host as a designated network bridge target, the display device recording information associated with the designated network bridge target, the first host activating a network bridge function, and the second host connecting to the external network using the network bridge function by accessing the information associated with the designated network bridge target via the display device.

The present invention also provides a method of providing multiple hosts with remote wake-up. The method includes a display device connecting to an external network and activating a network bridge option, setting a first host as a designated network bridge target after connecting the first host and a second host to the display device, the display device recording a first MAC address of the first host and a second MAC address of the second host, the display device receiving a WoL magic packet from a remote device after the first host and the second host enter a power-saving mode, the display device waking up the first host directly via a first USB hub when determining that the WoL magic packet corresponds to the first MAC address, and the display device waking up the second host via a second USB hub by sending a GPIO command to switch a KVM switch when determining that the WoL magic packet corresponds to the second MAC address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
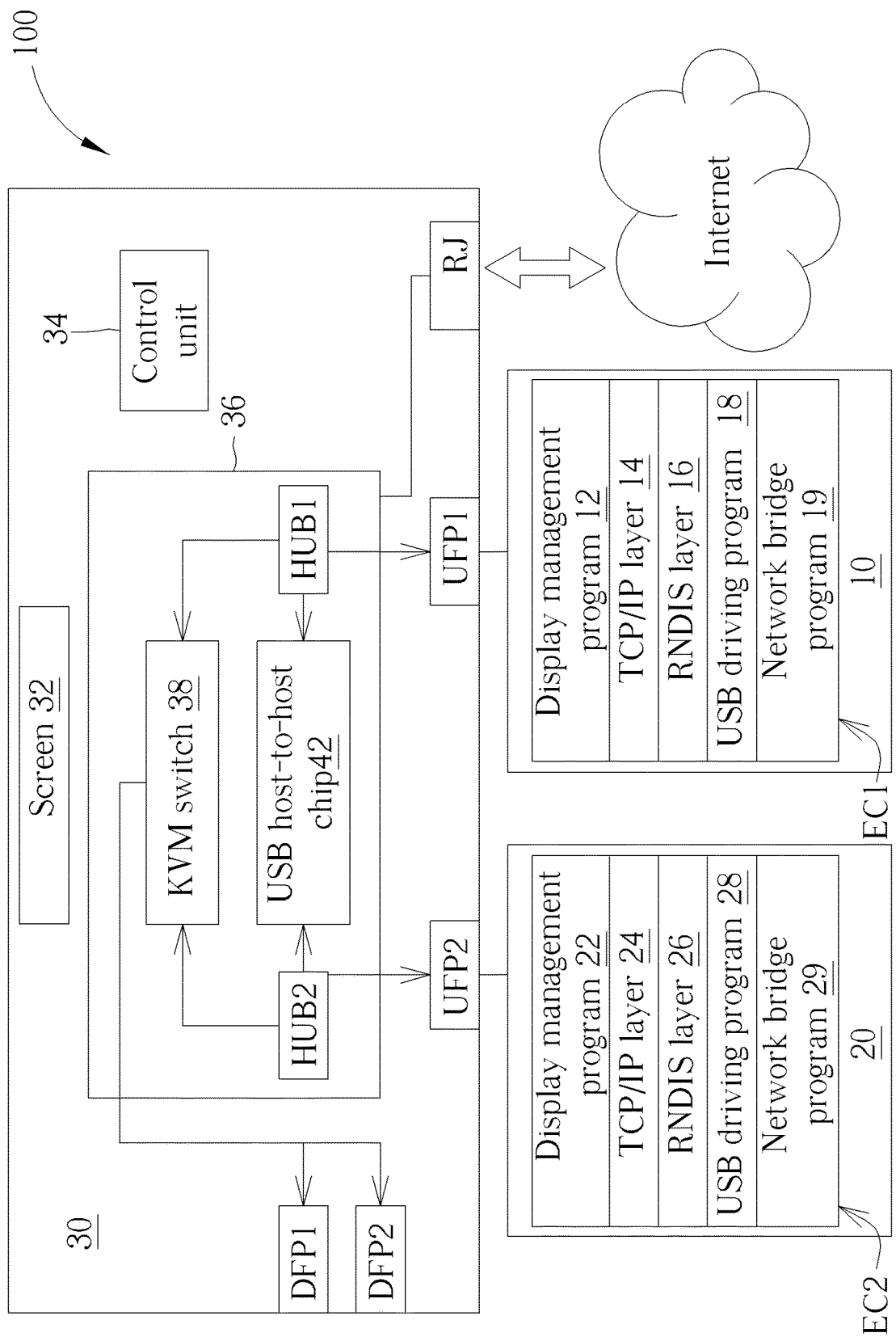
FIG. 1 is a functional diagram illustrating an electronic system according to an embodiment of the present invention.

FIG. 1 is a functional diagram illustrating an electronic system 100 according to an embodiment of the present invention. The electronic system 100 includes a first host 10, a second host 20 and a display device 30. The display device 30 includes a screen 32, a control unit 34, and a hub unit 36. The hub unit 36 includes a first universal serial bus (USB) hub HUB1, a second USB hub HUB2, a KVM switch 38, a USB host-to-host chip 42, UFP1/UFP2/DFP1/DFP2 ports, and a network interface port RJ.

The UFP1 and UFP2 ports are the upstream facing ports of the electronic system 100, and the DFP1 and DFP2 ports are the downstream facing ports of the electronic system 100. The first USB hub HUB1 is coupled to the upstream facing port UFP1, the KVM switch 38, and the USB host-to-host chip 42. The second USB hub HUB2 is coupled to the upstream facing port UFP2, the KVM switch 38, and the USB host-to-host chip 42. The downstream facing ports DFP1 and DFP2 are coupled to the KVM switch 38. The display device 30 may be connected to an external network Internet via the network interface port RJ. In an embodiment, the upstream facing ports UFP1 and UFP2 and the downstream facing ports DFP1 and DFP2 may be communication ports complying with USB specification, and the network interface port RJ may be an RJ45 connector for an Ethernet network. However, the implementation of the UFP1/UFP2/DFP1/DFP2 ports and the network interface port RJ does not limit the scope of the present invention.

The control unit 34 may be implemented as an SoC (system on a chip) integrates with multiple functions. For example, the control unit 34 may provide functions of a tuner, a demodulator, an analog-to-digital converter (ADC), digital-to-analog converter (DAC), a phase loop control (PLL) circuit, a video decoder, a de-interlacing circuit, a scalar and an OSD (on screen display) for controlling the operation of each device in the electronic system 100. However, the implementation of the control unit 34 does not limit the scope of the present invention.

The first host 10 includes an embedded controller EC1 coupled to the display device 30 via the upstream facing port UFP1. The embedded controller EC1 includes a display management program 12, a transmission control protocol/Internet protocol (TCP/IP) layer 14, a remote network driver interface specification (RNDIS) layer 16, a USB driving program 18, and a network bridge program 19. The second host 20 includes an embedded controller EC2 coupled to the display device 30 via the upstream facing port UFP2. The embedded controller EC2 includes a display management program 22, a TCP/IP layer 24, an RNDIS layer 26, a USB driving program 28, and a network bridge program 29.

Figure 2:
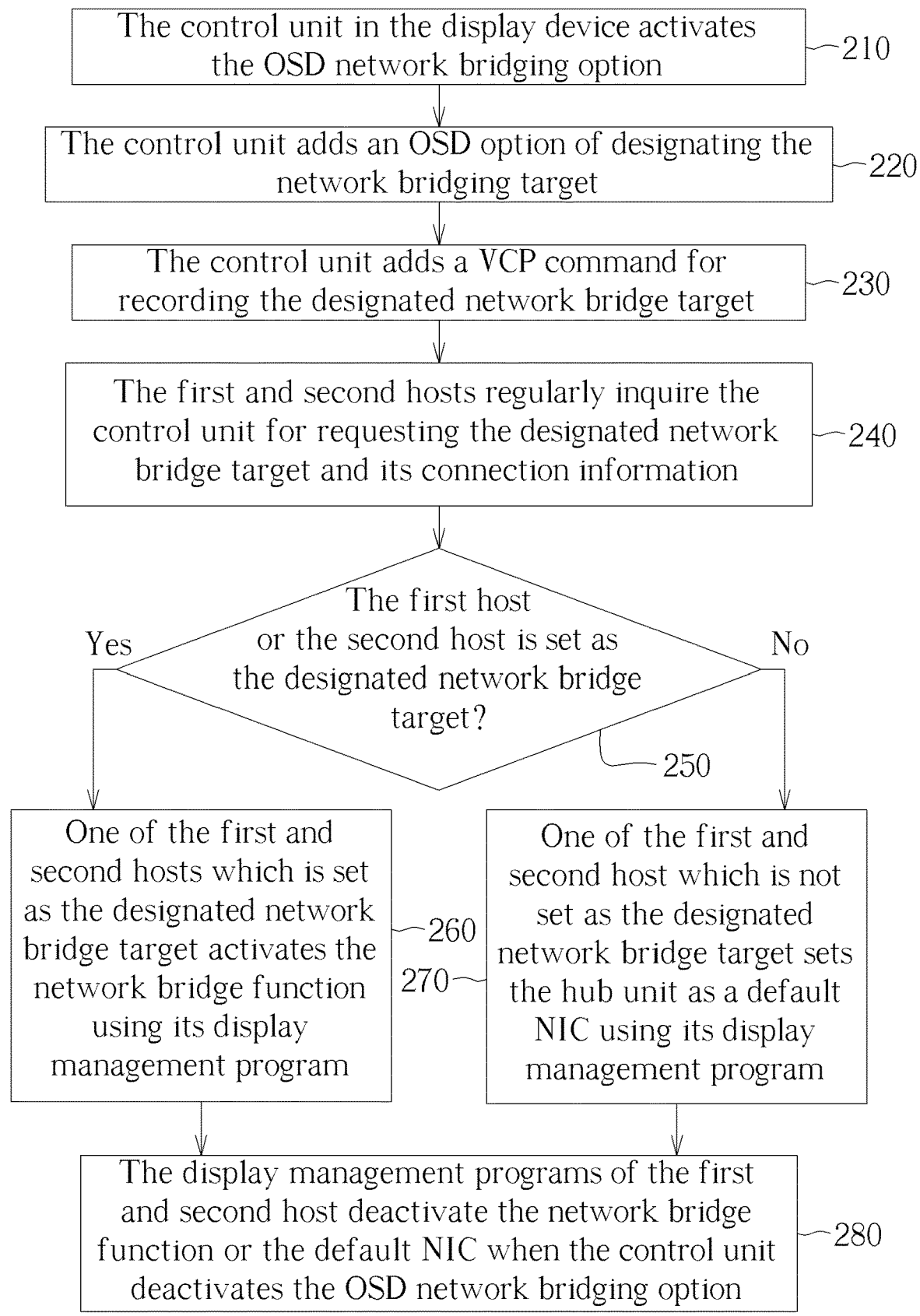
FIG. 2 is a flowchart illustrating the operation of an electronic system when providing multiple hosts with network connectivity according to an embodiment of the present invention.

FIG. 2 is a flowchart illustrating the operation of the electronic system 100 when providing multiple hosts with network connectivity according to an embodiment of the present invention. The flowchart in FIG. 2 includes the following steps:

Step 210: the control unit 34 in the display device 30 activates the OSD network bridging option.

Step 220: the control unit 34 adds an OSD option of designating the network bridging target.

Step 230: the control unit 34 adds a virtual control panel (VCP) command for recording the designated network bridge target.

Step 240: the first host 10 and the second host 20 regularly inquire the control unit 34 of the display device 30 by executing the display management programs 12 and 22 for requesting the designated network bridge target and its connection information.

Step 250: each of the first host 10 and the second host 20 determines whether it is set as the designated network bridge target; if yes, execute step 260; if no, execute step 270.

Step 260: one of the first host 10 and the second host 20 which is set as the designated network bridge target activates the network bridge function using its display management program.

Step 270: one of the first host 10 and the second host 20 which is not set as the designated network bridge target sets the hub unit 36 as a default network interface controller (NIC) using its display management program.

Step 280: the display management program 12 of the first host 10 and the display management program 22 of the second host 20 deactivate the network bridge function or the default NIC when the control unit 34 in the display device 30 deactivates the OSD network bridging option.

The control unit 34 in the display device 30 is configured to activate the OSD network bridging option in step 210 and add the OSD option of designating the network bridge target in step 220 for allowing the user to set the designated network bridge target. That is, one of the upstream facing ports UFP1 and UFP2 may be set to be associated with the designated network bridge target. For example, if the upstream facing port UFP1 is set to be associated with the designated network bridge target, the first host 10 may be recorded as the designated network bridge target by the VCP command added in step 230.

In step 240, the first host 10 and the second host 20 are configured to regularly inquire the control unit 34 of the display device 30 by executing the display management programs 12 and 22 for requesting the designated network bridge target and its connection information. The KVM switch 38 of the display device 30 allows the user to control multiple hosts using peripheral devices such as keyboard, screen or mouse (not shown in FIG. 1) and enables the display device 30 to display images from multiple hosts. In the embodiment of wireless connection, the connection information may include the IP addresses and the open port information of the first host 10 and the second host 20, wherein the open port information may include the serial number and communication protocol of at least one port. In the embodiment of wired connection, the first host 10 and the second host 20 may transmit the connection information to the display device 30 via a display data channel command interface (DDC/CI). However, the method of connecting the first host 10/the second host 20 to the display device 30 does not limit the scope of the present invention.

In step 250, the first host 10 and the second host 20 are configured to determine the method of connecting to the external network Internet based on the identity of the designated network bridge target. In step 260, one of the first host 10 and the second host 20 which is set as the designated network bridge target is configured to activate the network bridge function by executing its display management program. In step 270, the other one of the first host 10 and the second host 20 which is not set as the designated network bridge target is configured to set the hub unit 36 as the NIC by executing its display management program.

In an embodiment, it is assumed that the first host 10 coupled to the upstream facing port UFP1 is set as the designated network bridge target, and the second host 20 coupled to the upstream facing port UFP2 is not set as the designated network bridge target. Under such circumstance, the embedded controller EC1 of the first host 10 is configured to activate the network bridge function by running the network connection program 19 using the display management program 12 (step 260) and connect to the external network Internet via the RNDIS layer 16, the upstream facing port UFP1 and the network interface port RJ. Meanwhile, the embedded controller EC2 of the second host 20 is configured to set the hub unit 36 as the NIC by executing the display management program 22 and access the network bridge function of the RNDIS layer 16 via the upstream facing port UFP2, the hub unit 36 and the upstream facing port UFP1, thereby connecting to the external network Internet via the network interface port RJ.

In another embodiment, it is assumed that the second host 20 coupled to the upstream facing port UFP2 is set as the designated network bridge target, and the first host 10 coupled to the upstream facing port UFP1 is not set as the designated network bridge target. Under such circumstance, the embedded controller EC2 of the second host 20 is configured to activate the network bridge function by running the network connection program 29 using the display management program 22 (step 260) and connect to the external network Internet via the RNDIS layer 26, the upstream facing port UFP2 and the network interface port RJ. Meanwhile, the embedded controller EC1 of the first host 10 is configured to set the hub unit 36 as the NIC by executing the display management program 12 and access the network bridge function of the RNDIS layer 26 via the upstream facing port UFP1, the hub unit 36 and the upstream facing port UFP2, thereby connecting to the external network Internet via the network interface port RJ.

In step 280, when the control unit 34 in the display device 30 deactivates the OSD network bridging option, the display management program 12 of the first host 10 stops running the network bridging program 19 for deactivating the network bridge function, and the display management program 22 of the second host 20 deactivates the default NIC.

In the electronic system 100 of the present invention, when the first host 10 and the second host 20 are coupled to the display device 30 respectively via the upstream facing port UFP1 and the upstream facing port UFP2, the first host 10 and the second host 20 may be simultaneously connected to the external network Internet via the display device 30. Two hosts are used for illustrative purpose in the above-mentioned embodiment, but the number of hosts does not limit the scope of the present invention. The present electronic system 100 may provide more hosts with network connectivity in the same manner.

Figure 3:
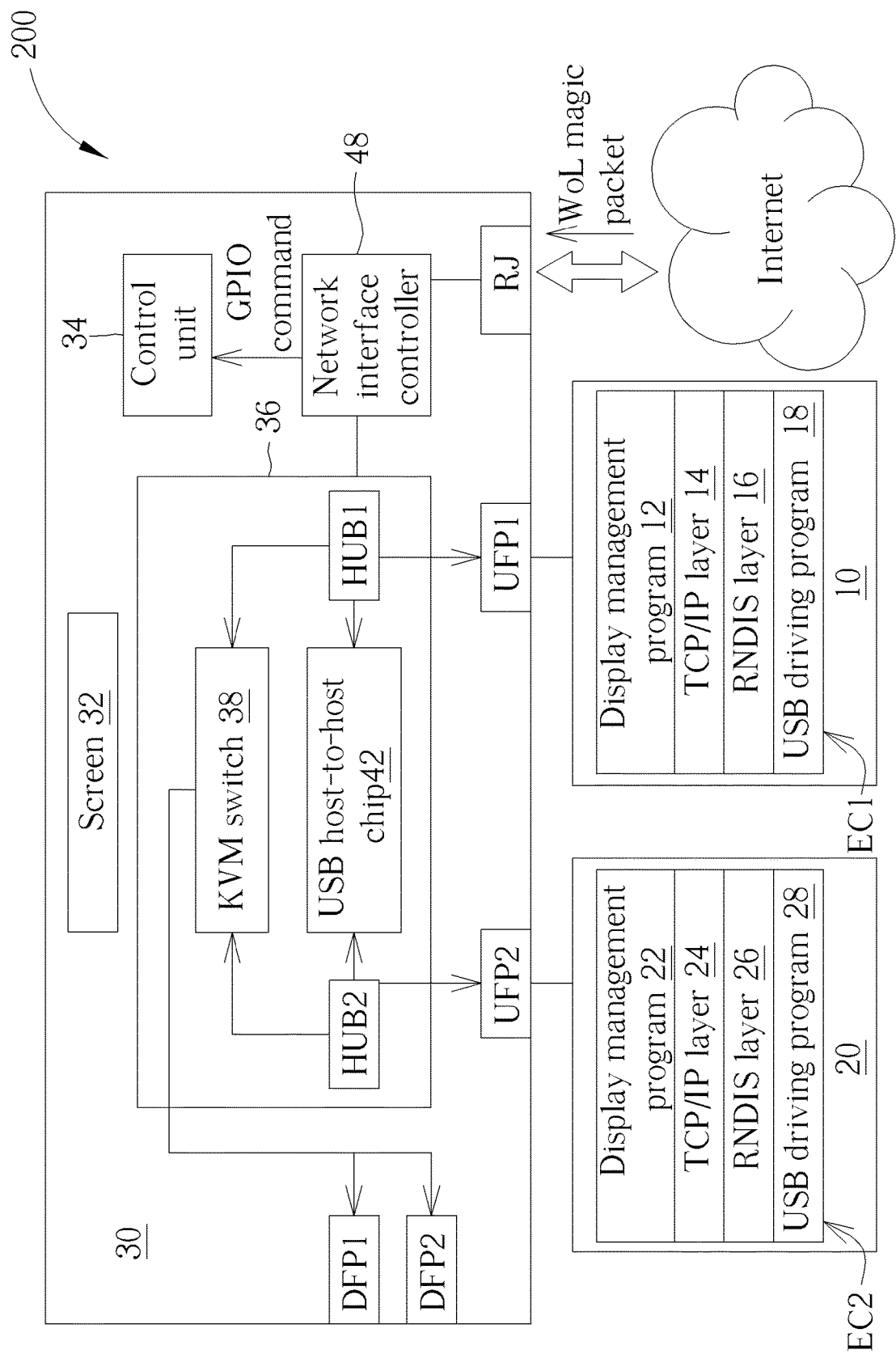
FIG. 3 is a functional diagram illustrating an electronic system according to another embodiment of the present invention.

FIG. 3 is a functional diagram illustrating an electronic system. 200 according to another embodiment of the present invention. The electronic system 200 includes a first host 10, a second host 20 and a display device 30. The display device 30 includes a screen 32, a control unit 34, a hub unit 36 and network interface controller 48. The hub unit 36 includes a first USB hub HUB1, a second USB hub HUB2, a KVM switch 38, a USB host-to-host chip 42, UFP1/UFP2/DFP1/DFP2 ports, and a network interface port RJ. The electronic systems 100 and 200 have similar structure, and their similarity will not be further elaborated. The electronic system 200 further includes the network interface controller 48 coupled to the control unit 34, the hub unit 36 and the network interface port RJ.

Figure 4:
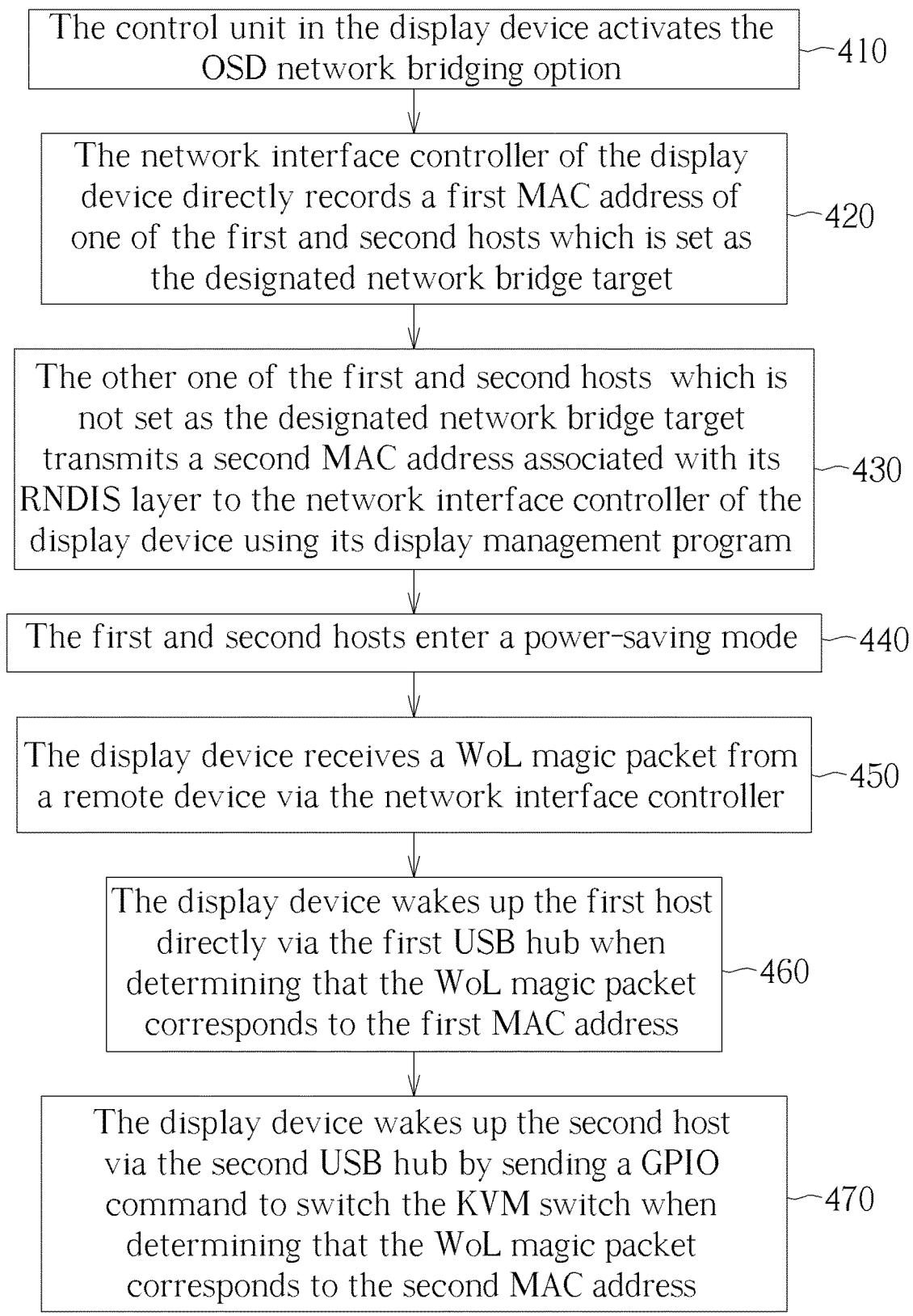
FIG. 4 is a flowchart illustrating the operation of an electronic system when providing multiple hosts with remote wake-up according to an embodiment of the present invention.

FIG. 4 is a flowchart illustrating the operation of the electronic system 200 when providing multiple hosts with remote wake-up according to an embodiment of the present invention. The flowchart in FIG. 4 includes the following steps:

Step 410: the control unit 34 in the display device 30 activates the OSD network bridging option.

Step 420: the network interface controller 48 of the display device 30 directly records a first media access control (MAC) address of one of the first host 10 and the second host 20 which is set as the designated network bridge target.

Step 430: the other one of the first host 10 and the second host 20 which is not set as the designated network bridge target transmits a second MAC address associated with its RNDIS layer to the network interface controller 48 of the display device 30 using its display management program.

Step 440: the first host 10 and the second host 20 enter a power-saving mode.

Step 450: the display device 30 receives a wake on LAN (WoL) magic packet from a remote device via the network interface controller 48.

Step 460: the display device 30 wakes up the first host 10 directly via the first USB hub HUB1 when determining that the WoL magic packet corresponds to the first MAC address.

Step 470: the display device 30 wakes up the second host 20 via the second USB hub HUB2 by sending a general purpose input output (GPIO) command to switch the KVM switch 38 when determining that the WoL magic packet corresponds to the second MAC address In step 410, the control unit 34 in the display device 30 is configured to activate the OSD network bridging option. In steps 420 and 430, the network interface controller 48 of the display device 30 is configured to record the access information of the first host 10 and the second host 20, such as recording the first MAC address of the first host 10 and the second MAC address of the second host 20. In an embodiment, it is assumed that the first host 10 is set as the designated network bridge target and the second host 20 is not set as the designated network bridge target. Under such circumstance, the network interface controller 48 of the display device 30 is configured to directly record the first MAC address of the first host 10 in step 420, and the second host 20 is configured to transmit its second MAC address to the network interface controller 48 of the display device 30 using the display management program 22.

After having been idled for a period of time, the first host 10 and the second host 20 may enter the power-saving mode in step 440 for reducing power consumption, such as entering a hibernate mode or a sleep mode. In step 450, the network interface controller 48 may receive the WoL magic packet from the external network Internet via the network interface port RJ, and then send a wake-up command to the control unit 34 for waking up the first host 10 and the second host 20 to operate in the normal mode.

In step 460, when the network interface controller 48 determines that the WoL magic packet corresponds to the first MAC address, the control unit 34 is configured to wake up the first host 10 directly via the first USB hub HUB1. In step 470, when the network interface controller 48 determines that the WoL magic packet corresponds to the second MAC address, the control unit 34 is configured to wake up the second host 20 via the second USB hub HUB2 by sending a GPIO command to switch the KVM switch 38.

In the electronic system 200 of the present invention, when the first host 10 and the second host 20 coupled to the display device 30 respectively via the upstream facing port UFP1 and the upstream facing port UFP2 enter the power-saving mode, the display device 30 may wake up the first host 10 and the second host 20 in response to a WoL magic packet from the external network Internet. Two hosts are used for illustrative purpose in the above-mentioned embodiment, but the number of hosts does not limit the scope of the present invention. The present electronic system 200 may provide more hosts with remote wake-up in the same manner.

In conclusion, the present electronic system provides multiple hosts with network connectivity and remote wake-up via a KVM and network bridge structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system which provides multiple hosts with network connectivity and remote wake-up, comprising:
    a display device, comprising:
        a network interface port for connecting to an external network;
        a first port;
        a second port;

a control unit configured to record information associated with a designated network bridge target; and
a hub unit configured to control signal transmission between the network interface port, the first port, the second port and the control unit;
a first host including a first embedded controller, coupled to the first port, and configured to activate a network bridge function when set as the designated network bridge target, thereby connecting to the external network via the network interface port; and
a second host including a second embedded controller, coupled to the second port, and configured to:
connect to the external network using the network bridge function via the second port, the hub unit and the first port;
set the hub unit as a default network interface controller (NIC) using a second display management program of the second embedded controller when not set as the designated network bridge target; and
connect to the external network via the default NIC when not set as the designated network bridge target.

2. The electronic system of claim 1, wherein the first host is further configured to:
run a first network bridge program using a first display management program of the first embedded controller when set as the designated network bridge target for activating the network bridge function; and
connect to the external network via a first remote network driver interface specification (RNDIS) layer when set as the designated network bridge target.

3. The electronic system of claim 2, wherein:
the first embedded controller includes the first display management program, a first transmission control protocol/Internet protocol (TCP/IP) layer, a first RNDIS layer, a first USB driving program, and a first network bridge program; and
the second embedded controller includes the second display management program, a second TCP/IP layer, a second RNDIS layer, a second USB driving program, and a second network bridge program.

4. The electronic system of claim 1, wherein the hub unit includes:
a KVM switch coupled to the control unit;
a first USB hub coupled to the first port and the KVM switch;
a second USB hub coupled to the second port and the KVM switch; and
a USB host-to-host chip coupled between the first USB hub and the second USB hub.

5. The electronic system of claim 4, wherein the display device further comprises a network interface controller coupled to the hub unit, the control unit and the network interface port, and configured to:
receive a wake on LAN (WoL) magic packet via the network interface port after the first host and the second host enter a power-saving mode; and
record access information associated with the first host and the second host.

6. The electronic system of claim 5, wherein:
the network interface controller is configured to directly access a first media access control (MAC) address of the first host when the first host is set as the designated network bridge target; and
the second host is further configured to transmit a second MAC address of the second host to the network interface controller using a second display management program of the second host when the second host is not set as the designated network bridge target.

7. The electronic system of claim 6, wherein after the first host and the second host enter the power-saving mode, the control unit is further configured to:
wake up the first host directly via the first USB hub when determining that the WoL magic packet corresponds to the first MAC address; and
wake up the second host via the second USB hub by sending a general purpose input output (GPIO) command to switch the KVM switch when determining that the WoL magic packet corresponds to the second MAC address.

8. A method of providing multiple hosts with network connectivity, comprising:
a display device connecting to an external network and activating a network bridge option;
a first host connecting to the external network after connecting the first host and a second host to the display device;
setting the first host as a designated network bridge target;
the display device recording information associated with the designated network bridge target;
the first host activating a network bridge function of a first remote network driver interface specification (RNDIS) layer by executing a first display management program;
the second host setting a second RNDIS layer of the display device as a default network interface controller; and
the first host and the second host simultaneously connecting to the external network using the network bridge function via the first RNDIS layer and the default network interface controller, respectively.

9. The method of claim 8, further comprising:
the display device adding a virtual control panel (VCP) command for recording the designated network bridge target; and
the first host and the second host regularly inquiring the display device respectively via the first display management program and the second display management program for requesting the designated network bridge target.

10. The method of claim 8, further comprising:
the first host deactivating the network bridge function via the first display management program and the second host deactivating the default network interface controller function via the second display management program when the display device deactivates the network bridging option.

11. A method of providing multiple hosts with remote wake-up, comprising:
a display device connecting to an external network and activating a network bridge option;
setting a first host as a designated network bridge target after connecting the first host and a second host to the display device;
the second host transmitting a second MAC address associated with a second RNDIS layer of the second host to the display device by executing a second display management program in a normal mode
the display device recording a first MAC address of the first host and the second MAC address of the second host;
the display device receiving a WoL magic packet from a remote device after the first host and the second host enter a power-saving mode;

the display device waking up the first host directly via a first USB hub when determining that the WoL magic packet corresponds to the first MAC address; and the display device waking up the second host via a second USB hub by sending a GPIO command to switch a KVM switch when determining that the WoL magic packet corresponds to the second MAC address.

12. The method of claim 11, further comprising:

the first host activating a network bridge function of a first RNDIS layer by executing a first display management program in a normal mode; and the display device recording the first MAC address associated with the first RNDIS layer.

* * * * *